US010783015B2

(12) United States Patent
On et al.

(10) Patent No.: US 10,783,015 B2
(45) Date of Patent: Sep. 22, 2020

(54) APPARATUS AND METHOD FOR PROVIDING LONG-TERM FUNCTION EXECUTION IN SERVERLESS ENVIRONMENT

(71) Applicant: ELECTRONICS AND TELECOMMUNICATIONS RESEARCH INSTITUTE, Daejeon (KR)

(72) Inventors: Jin-Ho On, Sejong (KR); Ki-Young Kim, Daejeon (KR); Gyu-Il Cha, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 27 days.

(21) Appl. No.: 16/213,332

(22) Filed: Dec. 7, 2018

(65) Prior Publication Data
US 2019/0179684 A1   Jun. 13, 2019

(30) Foreign Application Priority Data
Dec. 12, 2017   (KR) .......................... 10-2017-0170405

(51) Int. Cl.
| G06F 3/00 | (2006.01) |
| G06F 9/44 | (2018.01) |
| G06F 9/46 | (2006.01) |
| G06F 13/00 | (2006.01) |
| G06F 9/54 | (2006.01) |
| G06F 16/22 | (2019.01) |

(52) U.S. Cl.
CPC .............. *G06F 9/546* (2013.01); *G06F 16/22* (2019.01)

(58) Field of Classification Search
CPC ....................................................... G06F 9/546
USPC ........................................................... 719/314
See application file for complete search history.

(56) References Cited

U.S. PATENT DOCUMENTS

| 8,887,169 | B2 | 11/2014 | Wang |
| 8,949,847 | B2 | 2/2015 | Kim et al. |
| 9,973,942 | B2 | 5/2018 | Su et al. |
| 2009/0158285 | A1 | 6/2009 | Lee et al. |
| 2012/0278812 | A1* | 11/2012 | Wang ...................... G06F 9/505 |
| | | | 718/104 |

(Continued)

FOREIGN PATENT DOCUMENTS

| KR | 101436339 B1 | 9/2014 |
| KR | 101556840 B1 | 10/2015 |

(Continued)

*Primary Examiner* — Timothy A Mudrick

(57) ABSTRACT

Disclosed herein are an apparatus and method for providing long-term function execution in a serverless environment. The method for providing long-term function execution in a serverless environment is performed by an apparatus for providing long-term function execution in a serverless environment, and includes registering a long-term function execution proxy when a long-term execution request is received from a client, allocating a long-term function executor corresponding to the long-term execution request, executing, by the long-term function execution proxy, a long-term function using the allocated long-term function executor, and storing execution results of the long-term function.

18 Claims, 10 Drawing Sheets

(56) References Cited

U.S. PATENT DOCUMENTS

2015/0264135 A1    9/2015  Kandula et al.

FOREIGN PATENT DOCUMENTS

| KR | 1020160045388 A | 4/2016 |
| KR | 1020160132852 A | 11/2016 |
| KR | 1020170025326 A | 3/2017 |

* cited by examiner

APPARATUS AND METHOD FOR PROVIDING LONG-TERM FUNCTION EXECUTION IN SERVERLESS ENVIRONMENT

CROSS REFERENCE TO RELATED APPLICATION

This application claims the benefit of Korean Patent Application No. 10-2017-0170405, filed Dec. 12, 2017, which is hereby incorporated by reference in its entirety into this application.

BACKGROUND OF THE INVENTION

1. Technical Field

The present invention relates generally to technology for providing long-term function execution in a serverless environment, and more particularly, to technology for providing short-term execution and long-term execution in an execution platform for a large-scale serverless Function as a Service (FaaS).

2. Description of the Related Art

Generally, conventional traditional Information Technology (IT) systems have been developed based on a monolithic architecture. Due thereto, when an IT system is operated as a large-scale system, various problems have occurred in the course of development, maintenance, or operation thereof.

Meanwhile, a microservice architecture separates functions contained in a system into units of components, and conceptually establishes the components as a single service. Individual services have been operated in conjunction with each other within the concept of a Service-Oriented Architecture (SOA), and have provided efficient scalability and maintenance for large-capacity systems.

A serverless architecture is a form into which the concepts of Function as a Service (FaaS) and Backend as a Service (BaaS) are integrated, and is advantageous in that a single function can be registered and used by multiple users and individual functions can be executed in a combined manner. A single function in a serverless architecture is dynamically allocated and executed within a system to the extent of hardware specifications desired by a user regardless of the physical location of the corresponding function.

However, when a single function is dynamically allocated and executed as a short-term or long-term function, various problems may occur. Since, in most cases, functions are implemented based on a Representational State Transfer (REST) Application Programming Interface (API), there may occur the case where long-term execution of functions is impossible.

Also, in a conceptual microservice architecture, the sharing of hardware resources is not supposed to occur, and hardware resources must be clearly separated. However, there may be hardware, such as General-Purpose computing on Graphics Processing Units (GPGPU), which must be inevitably shared, but it is difficult to solve this problem in the conventional architecture.

Further, when a system is scaled on an execution-function basis rather than being extended from the standpoint of the entire system, scaling is performed based on the execution states of a large number of functions and the state information of hardware resources, but it is difficult for this approach to be efficiently implemented in a large-scale system.

Therefore, there is urgently required the development of a new platform architecture that is capable of solving the above conventional problems and very efficiently providing a process for developing, extending and maintaining a large-scale system. In connection with this, Korean Patent No. 10-1436339 discloses a technology related to "Task Assignment In Cloud Computing Environment".

SUMMARY OF THE INVENTION

Accordingly, the present invention has been made keeping in mind the above problems occurring in the prior art, and an object of the present invention is to efficiently execute a short-term function and a long-term function.

Another object of the present invention is to overcome limitations in scalability during execution of functions, and provide the scalability of physical servers and the scalability of systems.

A further object of the present invention is to provide short-term execution and long-term execution of a function in which shared resources are present and to efficiently manage the shared resources.

Yet another object of the present invention is to efficiently manage and execute a complicated and extensive system using only limited resources.

In accordance with an aspect of the present invention to accomplish the above objects, there is provided a method for providing long-term function execution in a serverless environment, the method being performed by an apparatus for providing long-term function execution in a serverless environment, the method including registering a long-term function execution proxy when a long-term execution request is received from a client, allocating a long-term function executor corresponding to the long-term execution request, executing, by the long-term function execution proxy, a long-term function using the allocated long-term function executor, and storing execution results of the long-term function.

Registering the long-term function execution proxy may include selecting a function execution node based on execution-related information corresponding to the long-term execution request, and storing, by a short-term function executor corresponding to the selected function execution node, a long-term execution message corresponding to the long-term execution request in a message queue.

Allocating the long-term function executor may include selecting a function execution node that enables long-term execution when the long-term execution message is registered in the message queue, and allocating a long-term function executor corresponding to the function execution node that enables long-term execution.

The method may further include receiving an execution result request from the client, and providing the stored execution results to the client.

Providing the execution results to the client may include calling a dashboard-related function when the execution result request is received, allowing the dashboard-related function to generate execution results based on at least one of a logger and a database, and providing the generated execution results to the client.

Generating the execution results may be configured such that a short-term function executor executes the dashboard-related function and generates the execution results.

A function executor including at least one of the long-term function executor and the short-term function executor may be configured to switch a state thereof to a standby state after execution of a function has been completed, and the function executor in the standby state may be allocated to execute a function corresponding to the request received from the client.

Selecting the function execution node may include determining whether there is a function executor in the standby state, when it is determined that there is no function executor in the standby state, storing an executable image of a function to be executed in the function execution node, and running the stored executable image, and storing a function code of the function, and setting a state of the function executor corresponding to the function execution node to the standby state.

In accordance with another aspect of the present invention to accomplish the above objects, there is provided an apparatus for providing long-term function execution in a serverless environment, including an Application Programming Interface (API) gateway for receiving a long-term execution request from a client, and registering a long-term function execution proxy when the long-term execution request is received, a global resource scheduler for receiving execution-related information corresponding to the long-term execution request from the API gateway, and selecting a function execution node based on the execution-related information, a function executor launcher for generating and managing a function executor corresponding to the selected function execution node, and a function executor for providing an environment in which a short-term function and a long-term function are executed, executing a function of the function execution node, and storing execution results of the function.

The function executor may include at least one of a short-term function executor, a long-term function executor, and a dashboard function executor.

The short-term function executor may be configured to, when the long-term function execution proxy is registered, store a long-term execution message corresponding to the long-term execution request received by the API gateway in a message queue.

The long-term function execution proxy may be configured to, when the long-term execution message is stored in the message queue, request the function execution node, and request the long-term function executor corresponding to the function execution node to execute the function.

The long-term function execution proxy may store execution results of the function executed by the long-term function executor in at least one of a logger and a database, and may return resources to the global resource scheduler.

The apparatus may further include storage for storing an executable code of the function and a lightweight container executable image related to an execution environment of the function, the logger for storing execution logs of the function, and the database for storing the execution results of the function.

The dashboard function executor may be configured to, when an execution result request is received from the client, generate execution results corresponding to the long-term execution request based on information stored in at least one of a logger and a database.

The function executor may switch a state thereof to a standby state after execution of the function has been completed, and the function executor in the standby state may be allocated to execute a function corresponding to a request received from the client.

The global resource scheduler may determine whether there is a function executor in a standby state, and select a function execution node corresponding to the function executor in the standby state when it is determined that there is the function executor in the standby state.

The function executor launcher may be configured to, when it is determined that there is no function executor in the standby state, generate the function executor and store changed resource usage information in the global resource scheduler.

The function executor launcher may be configured to operate the function executor by running an executable image of the function, and the function executor may store a function code of the function and set a state of the function executor to the standby state.

In accordance with a further aspect of the present invention to accomplish the above objects, there is provided a method for providing long-term function execution in a serverless environment, the method being performed by an apparatus for providing long-term function execution in a serverless environment, the method including receiving a long-term execution request from a client and storing a long-term execution message corresponding to the long-term execution request in a message queue using a short-term function executor, when the long-term execution message is registered in the message queue, allocating an execution node that enables long-term execution to operate a long-term function executor, and storing results of long-term execution corresponding to the long-term execution request, and when an execution result request is received from the client, generating execution results based on information stored in at least one of a logger and a database and returning the generated execution results to the client.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
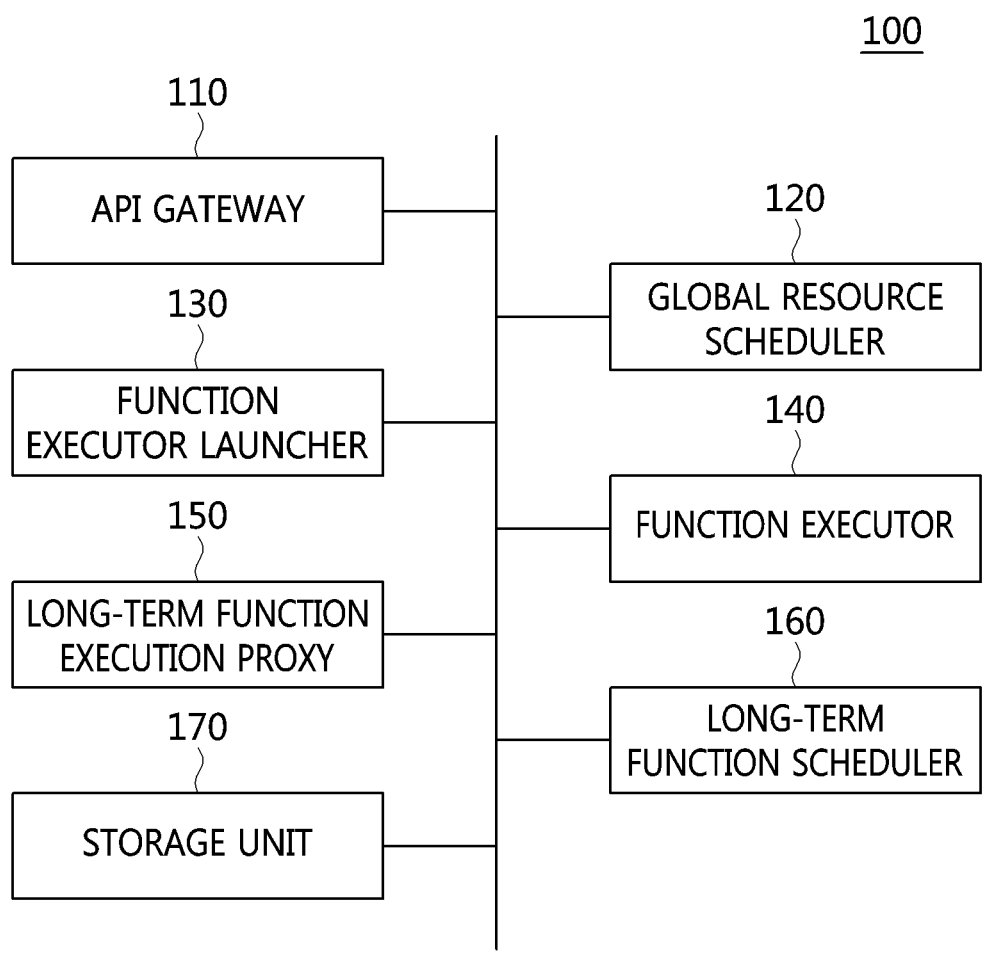
FIG. 1 is a block diagram illustrating the configuration of an apparatus for providing long-term function execution in a serverless environment according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and that they include all changes, equivalents or modifications included in the spirit and scope of the present invention.

The terms used in the present specification are merely used to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless differently defined, all terms used here including technical or scientific terms have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings, and repeated descriptions of the same components will be omitted.

Hereinafter, the configuration of an apparatus for providing long-term function execution in a serverless environment according to an embodiment of the present invention will be described in detail with reference to FIG. 1.

FIG. 1 is a block diagram illustrating the configuration of an apparatus for providing long-term function execution in a serverless environment according to an embodiment of the present invention.

As illustrated in FIG. 1, an apparatus 100 for providing long-term function execution in a serverless environment according to the embodiment of the present invention may include an API gateway 110, a global resource scheduler 120, a function executor launcher 130, a function executor 140, a long-term function execution proxy 150, a long-term function scheduler 160, and a storage unit 170.

First, the API gateway 110 receives a call for a function from outside and processes the call. The API gateway 110 may receive an execution request from an external client, and may register a long-term function execution proxy when a long-term execution request is received.

The global resource scheduler 120 manages and schedules an environment and resources in which functions are executed.

The global resource scheduler 120 receives execution-related information corresponding to the long-term execution request from the API gateway, and selects a function execution node based on the received execution-related information.

Here, the global resource scheduler 120 may determine whether there is a function executor in a standby state, and may select a function execution node corresponding to the function executor in the standby state if it is determined that there is a function executor in a standby state is present.

The function executor launcher 130 generates and manages a function executor requested by the global resource scheduler 120. Here, the function executor launcher 130 may include a GPGPU router that provides a function of sharing a GPGPU, which is one of shared resources.

The function executor launcher 130 may generate a function executor corresponding to the selected function execution node. Also, the function executor launcher 130 may operate the corresponding function executor by running a lightweight container executable image for a function execution environment.

Also, if it is determined by the global resource scheduler 120 that there is no function executor in a standby state, the function executor launcher 130 may generate a function executor, and may store changed resource usage information in the global resource scheduler 120.

The function executor 140 provides an environment in which short-term functions and long-term functions are executed, receives an actual function from the storage unit, and executes the received function. Here, the function executor 140 may include at least one of a short-term function executor, a long-term function executor, and a dashboard function executor.

Here, the term "short-term function executor" refers to an executor on which a function to be executed in the short term is executed, and the term "long-term function executor" refers to an executor on which a function to be executed in the long term is executed. The long-term function executor may execute a long-term operation process that consumes a time period such as several hours to several days, as in the case of a Machine Language (ML) training process, and may be operated in conjunction with the long-term function execution proxy and the long-term function scheduler.

Further, the dashboard function executor, which is a function executor for generating operation data on dashboards and returning the operation data to the user, may be one of short-term function executors. When an execution result request is received from the client, the dashboard function executor may generate execution results corresponding to a long-term execution request based on information stored in at least one of a logger and a database (DB).

When registration of a long-term function execution proxy is performed, the short-term function executor may store a long-term execution message corresponding to the long-term execution request in a message queue.

When the function executor 140 is operated by the function executor launcher, the function executor 140 may store a function code, and may set the state of the function executor to a standby state. Also, the function executor 140 switches its state to a standby state after execution of the function has been completed.

Further, the function executor 140 in the standby state may be allocated to execute the function corresponding to a request received from the client, and may be managed by the global resource scheduler 120.

The long-term function execution proxy 150, which is a proxy for managing execution of long-term functions, executes the long-term functions using the allocated long-term function executor.

When a message is registered in the message queue, the long-term function execution proxy 150 may request a function execution node, and may also request a long-term function executor corresponding to the function execution node in order to execute the function.

When a long-term function is executed, the long-term function scheduler 160 manages the long-term function depending on the state of the apparatus 100 for providing long-term function execution in a serverless environment.

The storage unit 170 stores images and executable code required by the apparatus 100 for providing long-term function execution in a serverless environment. The storage unit 170 may include source storage for storing executable code of functions registered by the user and lightweight container image storage for storing a lightweight container executable image for an execution environment in which functions are executed.

Also, the storage unit 170 may further include a network logger for storing logs for short-term functions, long-term functions, and the apparatus 100 for providing long-term function execution in a serverless environment. The storage unit 170 may further include a database (DB) for storing the execution results of long-term functions, information requiring permanence, etc.

Below, a method for providing long-term execution of a function, which is performed by the apparatus for providing long-term function execution in a serverless environment, according to an embodiment of the present invention will be described in detail with reference to FIG. 2.

Figure 2:
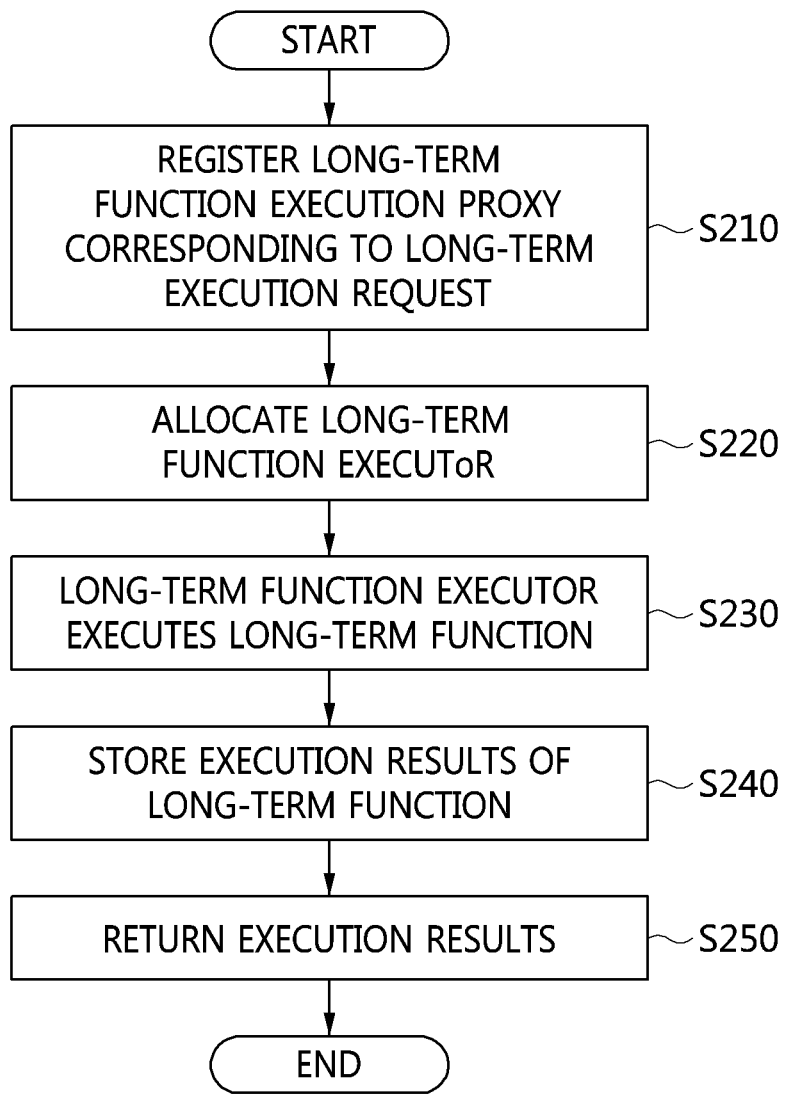
FIG. 2 is a flowchart illustrating a method for providing long-term function execution in a serverless environment according to an embodiment of the present invention.

FIG. 2 is a flowchart illustrating a method for providing long-term function execution in a serverless environment according to an embodiment of the present invention.

First, the apparatus 100 for providing long-term function execution in a serverless environment registers a long-term function execution proxy when a long-term execution request is received at step S210.

The apparatus 100 for providing long-term function execution in a serverless environment may receive a function execution request from a client. Here, when a long-term execution request is received from the client, the apparatus 100 for providing long-term function execution in a serverless environment registers the long-term function execution proxy so as to process the long-term execution request.

The apparatus 100 for providing long-term function execution in a serverless environment may register the long-term execution request in the system and register the long-term function execution proxy, which will execute and manage the long-term function, by calling a short-term function and then storing the long-term execution request in a message queue.

Next, the apparatus 100 for providing long-term function execution in a serverless environment allocates a long-term function executor corresponding to the long-term execution request at step S220.

The apparatus 100 for providing long-term function execution in a serverless environment executes a long-term function corresponding to the long-term execution request registered in the message queue at step S210.

The apparatus 100 for providing long-term function execution in a serverless environment allocates an execution node including resources that enable long-term execution, and operates the long-term function executor corresponding to the allocated execution node.

The process in which the apparatus 100 for providing long-term function execution in a serverless environment processes the long-term function execution request at steps S210 and S220 will be described in greater detail later with reference to FIG. 8.

Further, the long-term function execution proxy of the apparatus 100 for providing long-term function execution in a serverless environment executes the long-term function using the allocated long-term function executor at step S230, and the apparatus 100 for providing long-term function execution in a serverless environment stores the execution results of the long-term function at step S240.

The apparatus 100 for providing long-term function execution in a serverless environment may conduct the long-term execution process through parameters requested by the client. Here, the parameters may be contained in the long-term execution request received at step S210.

Next, the apparatus 100 for providing long-term function execution in a serverless environment allows the long-term function executor to execute a long-term function corresponding to the long-term function execution request through the long-term function execution proxy registered at step S210.

The process in which the apparatus 100 for providing long-term function execution in a serverless environment executes the long-term function at steps S230 and S240 will be described in detail later with reference to FIG. 9.

Finally, when an execution result request is received from the client, the apparatus 100 for providing long-term function execution in a serverless environment provides the stored execution results for the long-term function to the client at step S250.

The apparatus 100 for providing long-term function execution in a serverless environment performs a short-term function execution process. Also, the apparatus 100 for providing long-term function execution in a serverless environment may provide the execution results of the long-term function to the client via dashboards.

The process in which the apparatus 100 for providing long-term function execution in a serverless environment provides the execution results of the long-term function to the client will be described in detail later with reference to FIG. 10.

Below, the process for processing a long-term execution request and checking the results of long-term execution according to an embodiment of the present invention will be described in detail with reference to FIGS. 3 and 4.

Figure 3:
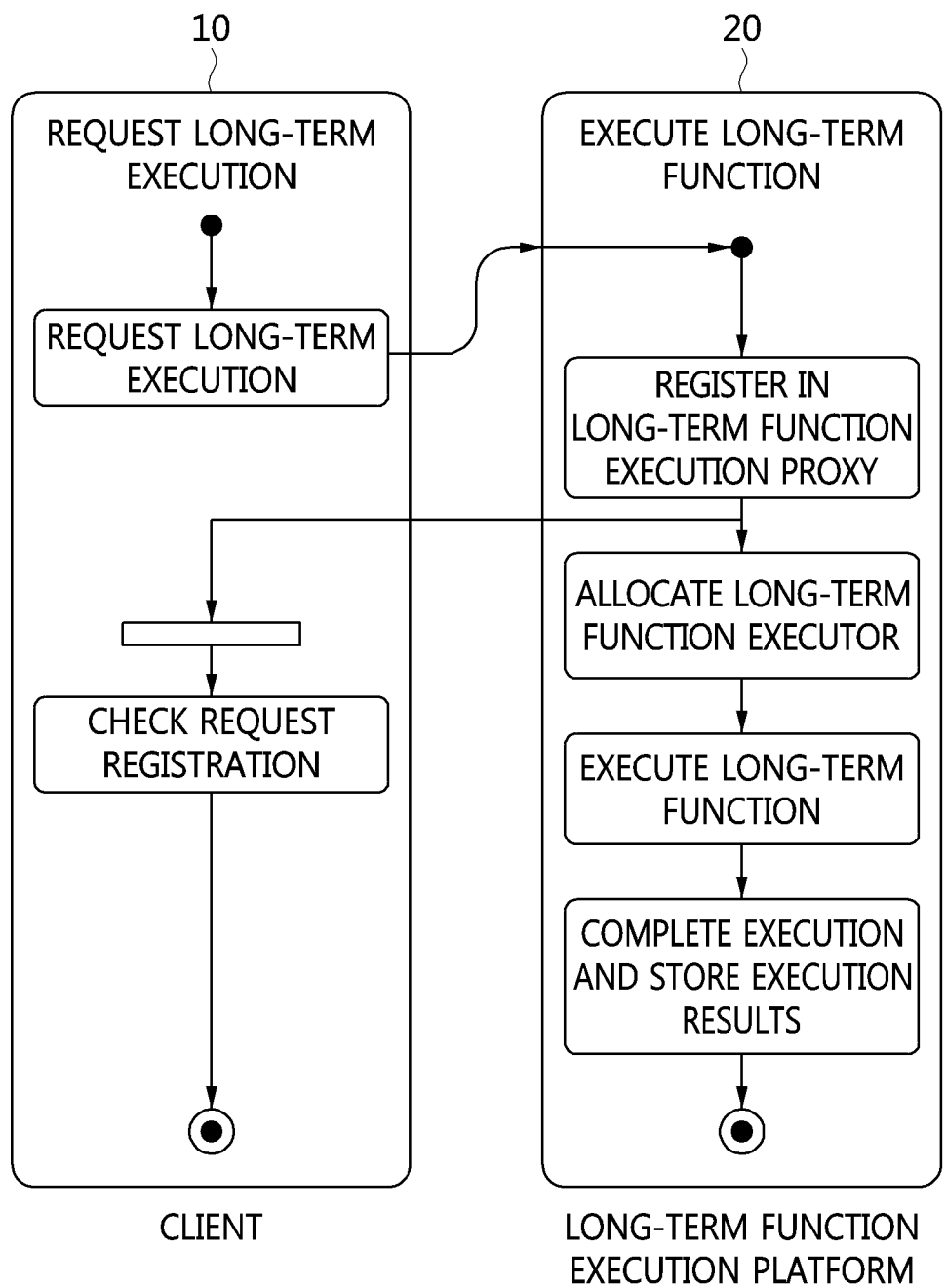
FIG. 3 is a diagram illustrating a process for processing a long-term execution request according to an embodiment of the present invention.

FIG. 3 is a diagram illustrating a process for processing a long-term execution request according to an embodiment of the present invention.

As illustrated in FIG. 3, an external client 10 transmits a long-term execution request to a long-term function execution platform 20 to which the apparatus 100 for providing long-term function execution in a serverless environment according to the embodiment of the present invention is applied.

The long-term function execution platform 20, having received the long-term execution request, registers the request in a long-term function execution proxy and allocates a long-term function executor. Further, the long-term function execution platform 20 may execute a long-term function, and may store the execution results of the long-term function.

Here, the long-term function execution platform 20 may register the long-term execution request in the long-term function execution proxy, and may then notify the client 10 that registration of the long-term execution request has been completed.

Figure 4:
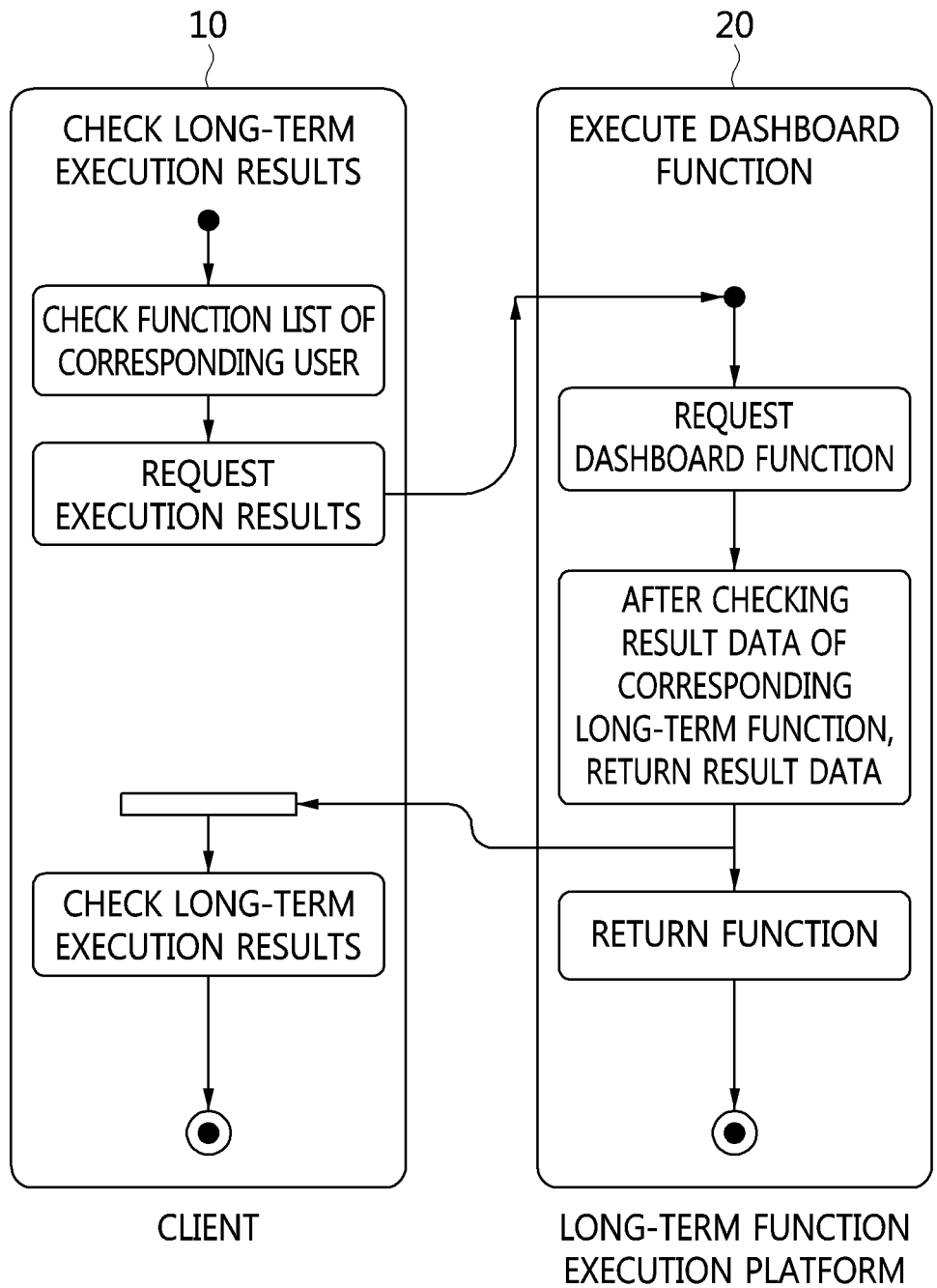
FIG. 4 is a diagram illustrating a process for checking the results of long-term execution according to an embodiment of the present invention.

FIG. 4 is a diagram illustrating a process for checking the results of long-term execution according to an embodiment of the present invention.

As illustrated in FIG. 4, the client 10 may check the function list of the corresponding user in order to check the results of a long-term function, and may request the execution results from the long-term function execution platform 20.

Further, the long-term function execution platform 20 may request a dashboard function and check the result data of the corresponding long-term function, and may then return the results of the long-term function to the client 10. Also, after returning the results to the client 10, the long-term function execution platform 20 may return the dashboard function.

Due to the characteristics of the long-term function, the time at which execution of the long-term function will be completed cannot be predicted. Therefore, the process for checking the execution results of a long-term function in the middle of executing the long-term function may be performed separately from a procedure for requesting execution of the long-term function.

Below, an environment to which the apparatus for providing long-term function execution in a serverless environment according to an embodiment of the present invention is applied will be described in detail with reference to FIG. 5.

Figure 5:
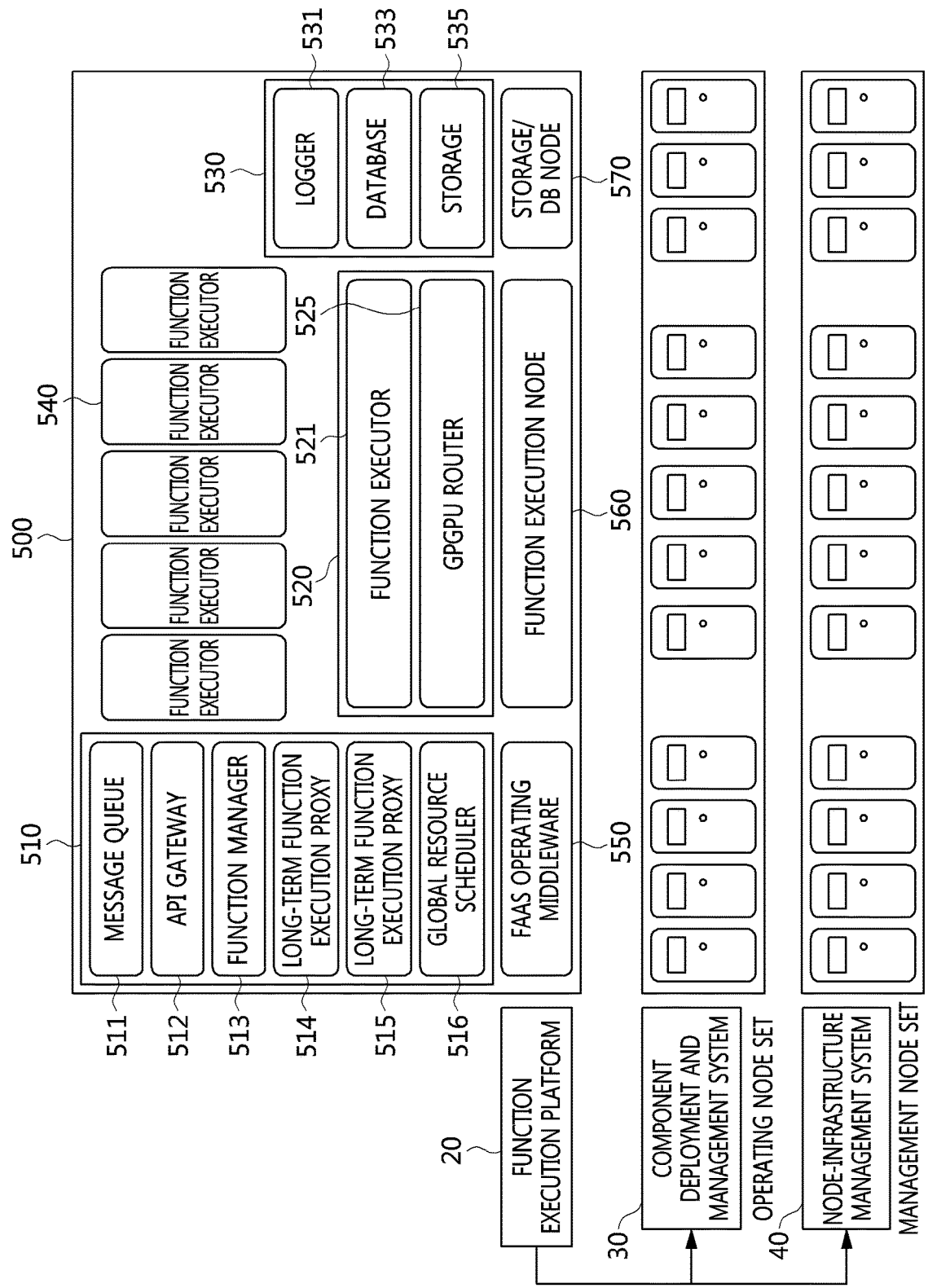
FIG. 5 is a diagram illustrating an environment to which an apparatus for providing long-term function execution in a serverless environment according to an embodiment of the present invention is applied.

FIG. 5 is a diagram illustrating an environment to which an apparatus for providing long-term function execution in a serverless environment according to an embodiment of the present invention is applied.

As illustrated in FIG. 5, a system to which the apparatus for providing long-term function execution in a serverless environment is applied may include a function execution platform 20, a component deployment and management system 30, and a node-infrastructure management system 40.

The component deployment and management system 30 may be a deployment and management system for a service such as Juju, a component or an application, and may be operated in conjunction with the node infrastructure management system 40. Further, the node infrastructure management system 40 may be a physical server management system, such as Monitoring as a Service (MaaS), and may provide a physical server as cloud resources.

An apparatus 500 for providing long-term function execution in a serverless environment according to an embodiment of the present invention may isolate the system from a physical layer using the node infrastructure management system 40, and may isolate a system operating layer using the component deployment and management system 30.

Also, the function execution platform 20 performs execution and management of a function registered by the user on the infrastructure of the node infrastructure management system 40 and the component deployment and management system 30. When a new node is needed to extend the system, the function execution platform 20 may extend the system using the node infrastructure management system 40 and the component deployment and management system 30, and may configure the node in the state in which execution of a function is possible.

The apparatus 500 for providing long-term function execution in a serverless environment may allocate and manage an execution node which takes charge of execution of functions in a serverless architecture, and may provide scalability of the serverless architecture.

The present invention, which relates to an architecture for providing execution of short-term functions and long-term functions in a large-scale serverless system, may provide an architecture for efficiently utilizing shared resources of the entire system.

As illustrated in FIG. 5, the apparatus 500 for providing long-term function execution in a serverless environment according to the embodiment of the present invention may be operated on a function execution platform, and may include a function execution management unit 510, a function execution support unit 520, a storage unit 530, one or more function executors 540, FaaS operating middleware 550, a function execution node 560, and a storage/DB node 570.

The function execution management unit 510 includes a message queue 511, an API gateway 512, a function manager 513, a long-term function execution proxy 514, a long-term function scheduler 515, and a global resource scheduler 516.

The message queue 511 temporarily stores a long-term execution request received from a user. Also, the API gateway 512 takes charge of the call of a function from an external client, and the function manager 513 performs registration and management of functions and manages sources.

The long-term function execution proxy 514 executes and manages a long-term function, the long-term function scheduler 515 manages long-term functions to be executed, and the global resource scheduler 516 manages and schedules an environment and resources in which each function is executed.

The function execution support unit 520 may include a function executor launcher 521 and a GPGPU router 525, and the storage unit 530 may include a logger 531, a database (DB) 533, and storage 535.

The function executor launcher 521 may generate and manage a function executor 540 requested by the global resource scheduler 516, and the GPGPU router 525 may provide a function of sharing a GPGPU, which is one of shared resources.

The logger 531 may store logs of short-term functions, long-term functions, and the apparatus 500 for providing long-term function execution in a serverless environment, and the DB 533 may store the results of long-term functions, etc. Further, the storage 535 may store images, executable code of functions, etc., required by the apparatus 500 for providing long-term function execution in a serverless environment.

Each of the function executors 540 may provide an environment in which short-term functions and long-term functions are executed, and may receive an actual function from the storage 535 and execute the actual function. The function executors 540 may include short-term function executors on which functions requiring a short period are executed and long-term function executors on which long-term functions requiring several hours or several days are executed. Further, a dashboard function executor, which is one of the short-term function executors, may generate dynamic data on dashboards, and may return the dynamic data to the client.

Furthermore, the long-term function executors may be operated in conjunction with the long-term function execution proxy 514 and the long-term function scheduler 515.

Below, the execution flow of a short-term function according to an embodiment of the present invention will be described in detail with reference to FIG. 6.

Figure 6:
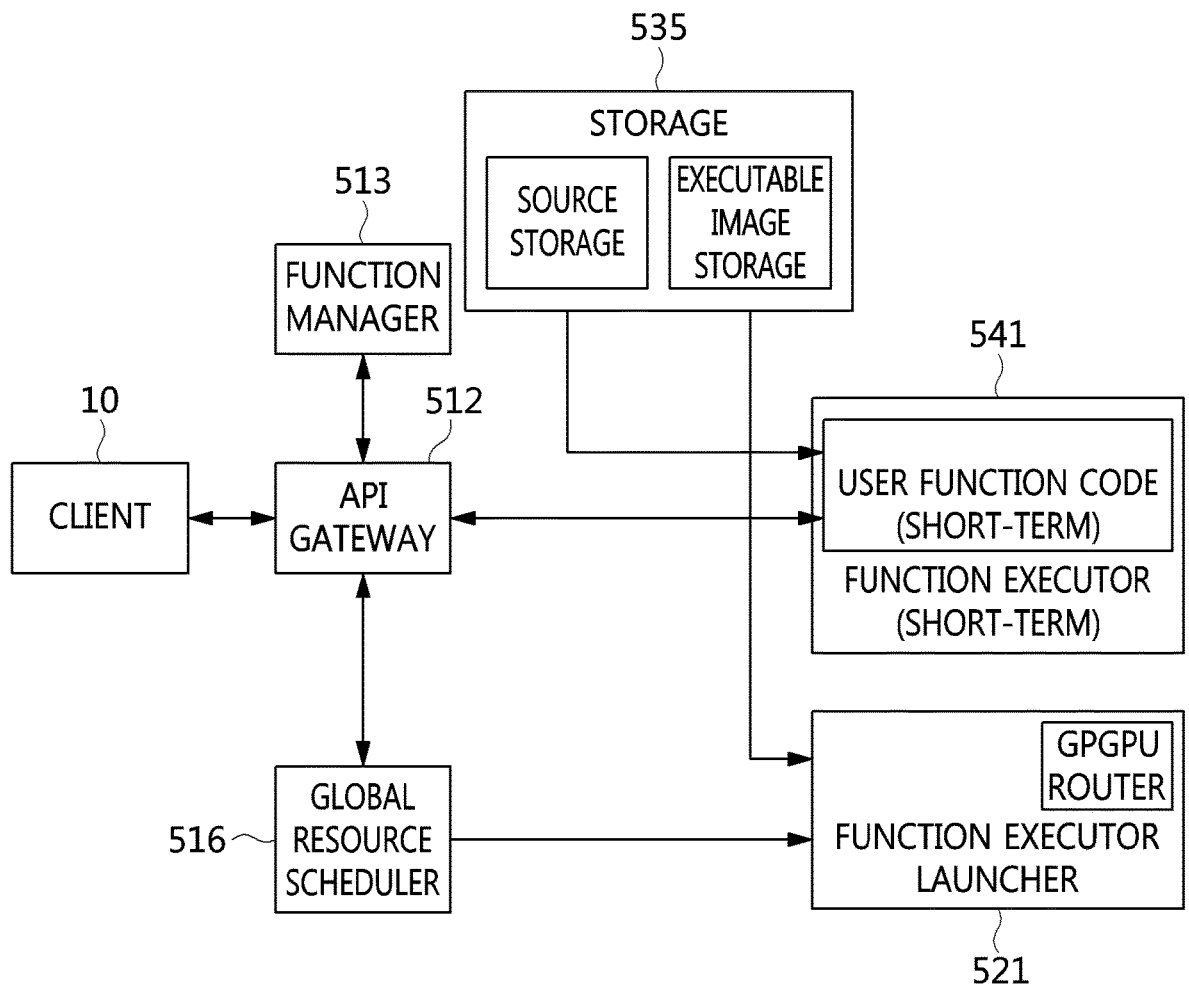
FIG. 6 is a diagram illustrating the flow of execution of a short-term function according to an embodiment of the present invention.

FIG. 6 is a diagram illustrating the execution flow of a short-term function according to an embodiment of the present invention.

The process of FIG. 6 illustrates the execution flow of a short-term function that is performed upon initial execution in which there is no function executor in a standby state.

As illustrated in FIG. 6, when an API gateway 512 receives a short-term execution request from a client 10, the API gateway 512 searches a function manager 513 for a function corresponding to the short-term execution request. Further, the API gateway 512 may request an execution node from a global resource scheduler 516 by transferring function execution information, which indicates function search results, to the global resource scheduler 516.

The global resource scheduler 516 may select a function execution node based on various types of information to be considered for scheduling, and may request the function executor launcher 521 corresponding to the selected function execution node to execute the function.

The function executor launcher 521 receives an executable image, which is a lightweight container-based execution environment corresponding to the function, from the storage 535, stores the received executable image in the function execution node, and runs the executable image based on parameter information received from the global resource scheduler 516.

When the executable image runs, a short-term function executor 541 receives a function code (i.e. user function code) from the storage 535, stores the function code in a container, and sets the state of the short-term function executor to an execution standby state.

The function executor launcher 521, having confirmed readiness from the short-term function executor 541, transmits readiness information to the global resource scheduler 516, and the global resource scheduler 516 transmits address and related information for calling a function to the API gateway 512.

The API gateway 512 calls the short-term function executor 541 using the parameter received from the client 10 and the address transferred from the global resource scheduler 516.

The short-term function executor 541 may complete execution corresponding to a short-term function execution request, and may return the execution results to the API gateway 512, and the API gateway 512 may return the final results to the client 10.

Here, the short-term function executor 541 is managed by the global resource scheduler 516. When execution of the function has been completed in the short-term function executor 541, which has been operated once, the short-term function executor 541 switches its state to a standby state so that it is capable of being reused. When a new request is received, the global resource scheduler 516 may send the address of a reusable function executor to the API gateway 512 so that the existing function executor is reused.

Also, the global resource scheduler 516 may manage the short-term function executor 541 in consideration of at least one of the call frequency of each function and the state information of resources, and may remove a function executor that is not frequently used, thus improving system efficiency.

Below, the execution flow of a long-term function according to an embodiment of the present invention will be described in detail with reference to FIGS. 7 to 10.

Figure 7:
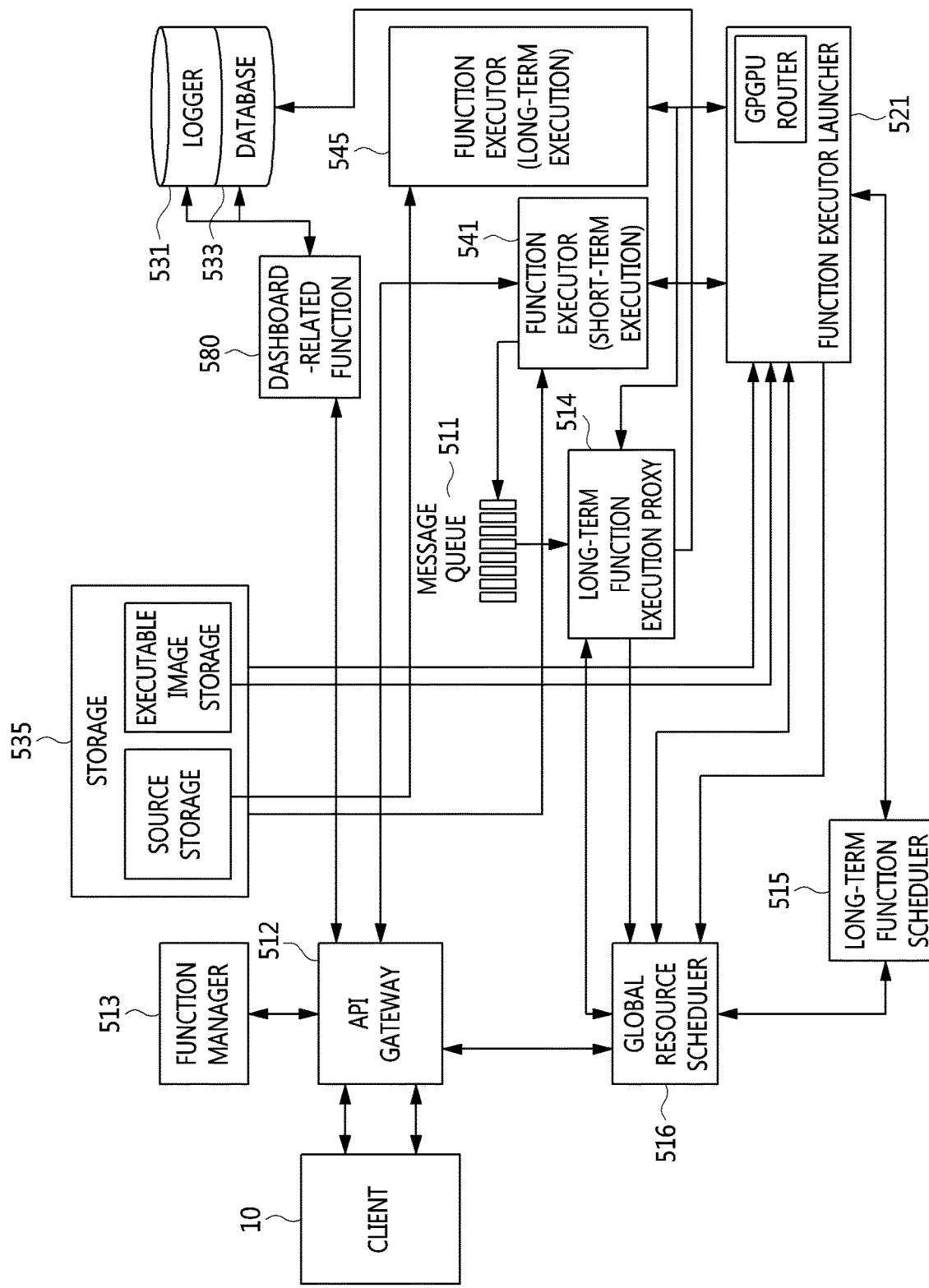
FIG. 7 is a diagram illustrating the flow of execution of a long-term function according to an embodiment of the present invention.

FIG. 7 is a diagram illustrating the execution flow of a long-term function according to an embodiment of the present invention.

In FIG. 7, a process for executing a long-term function may be chiefly divided into a request step, an execution step, and a result checking step.

When a client 10 sends a long-term execution request to the API gateway 512, the apparatus for providing long-term function execution in a serverless environment stores the long-term function in a message queue 511 by calling a short-term function executor 541. The step of requesting the long-term function will be described in detail later with reference to FIG. 8.

Next, when the long-term function is registered in the message queue 511, a long-term function executor 545 is operated through the long-term function execution proxy 514, the long-term function is executed, and execution results are stored. The step of executing the long-term function will be described in detail later with reference to FIG. 9.

Further, when a request for the execution results of the long-term function is received from the client 10, the dashboard function executor 580 may generate execution results corresponding to the long-term execution request based on information stored in at least one of a logger 531 and a DB 533. The result checking step of processing the execution result request received from the client 10 will be described in detail later with reference to FIG. 10.

Figure 8:
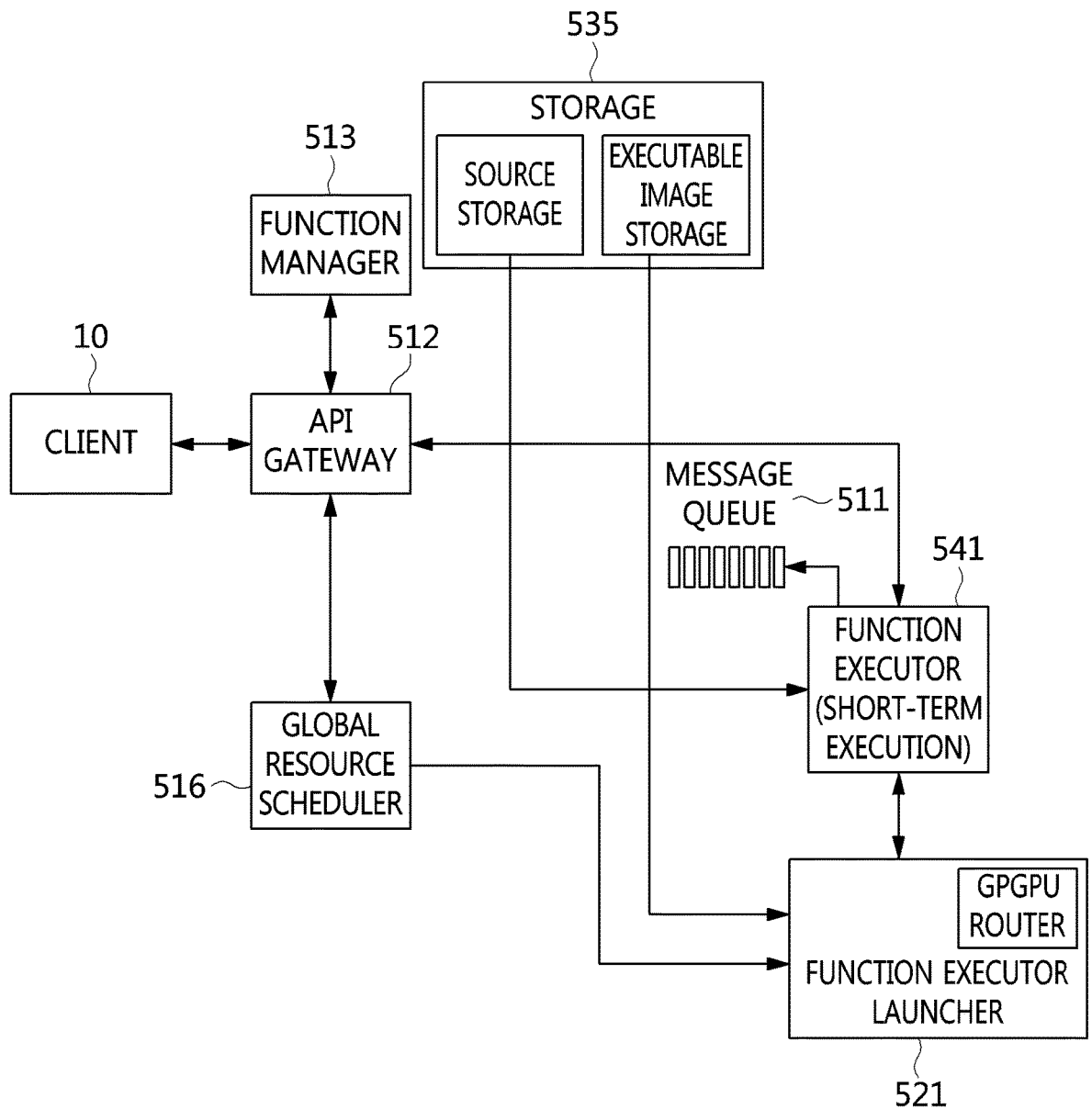
FIG. 8 is a diagram illustrating a process for processing a long-term function execution request according to an embodiment of the present invention.

FIG. 8 is a diagram illustrating a process for processing a request for execution of a long-term function according to an embodiment of the present invention.

As illustrated in FIG. 8, a client 10 transmits a long-term execution request to an API gateway 512. The API gateway 512, having received the long-term execution request, checks a command and data, corresponding to the long-term execution request, searches a function manager 513 for a function corresponding to the long-term execution request, and receives information related to long-term execution (i.e. function meta-information) from the function manager 513.

Also, the API gateway 512 requests a function execution node from a global resource scheduler 516 by transmitting information about long-term execution to the global resource scheduler 516. The global resource scheduler 516 selects the function execution node and requests execution from a function executor launcher 521 present in the selected function execution node.

In this case, the global resource scheduler 516 checks an executable node. As a result of the checking, if it is determined that a short-term function executor 541 in a standby state is present, the global resource scheduler 516 may select a function execution node corresponding to the short-term function executor 541 in the standby state after skipping the procedure for generating a short-term function executor 541 and a procedure for storing changed resource usage information in the global resource scheduler 516, which will be described later.

In contrast, if it is determined that there is no short-term function executor 541 in a standby state, the function executor launcher 521 generates a short-term function executor 541, and the global resource scheduler 516 stores changed resource usage information.

Further, the global resource scheduler 516 may transmit information about the function execution node corresponding to the generated short-term function executor 541 or the selected short-term function executor 541 in the standby state to the API gateway 512. The API gateway 512 may request execution from the short-term function executor 541 of the corresponding function execution node.

Next, the function executor launcher 521 receives an executable image for a lightweight container-based execution environment, which corresponds to the function, from an executable image storage 535, stores the executable image in the function execution node, and runs the stored executable image based on parameter information received from the global resource scheduler 516.

When the executable image runs, the short-term function executor 541 receives a function code from the source storage 535, stores the function code in the container, and switches the state of the short-term function executor 541 to an execution standby state. Furthermore, the short-term function executor 541 notifies the function executor launcher 521 that it is in the execution standby state.

The function executor launcher 521 notifies the global resource scheduler 516 of readiness, and the global resource scheduler 516, having been notified of readiness, transmits an address and call-related information for calling a function to the API gateway 512.

The API gateway 512 calls a function using the address required for a function call and call-related information received from the global resource scheduler 516 and parameters received from the client 10. Also, the short-term function executor 541 may create a message for executing a long-term function based on the information received from the API gateway 512, and registers the created message in the message queue.

When registration in the message queue is completed, the short-term function executor 541 notifies the API gateway 512 that the registration of the message for executing the long-term function has been completed, and the API gateway 512 transmits information indicating the completion of registration to the client.

By means of the process for processing the request for execution of the long-term function of FIG. 8, the apparatus 500 for providing long-term function execution in a serverless environment may register a long-term function execution proxy.

Further, the process of FIG. 8 indicates the case of initial execution, in which there is no function executor in a standby state. When there is a function executor in a standby state, the apparatus 500 for providing long-term function execution in a serverless environment may skip a procedure for generating a short-term function executor 541 and a procedure for storing changed resource usage information in the global resource scheduler 516.

Figure 9:
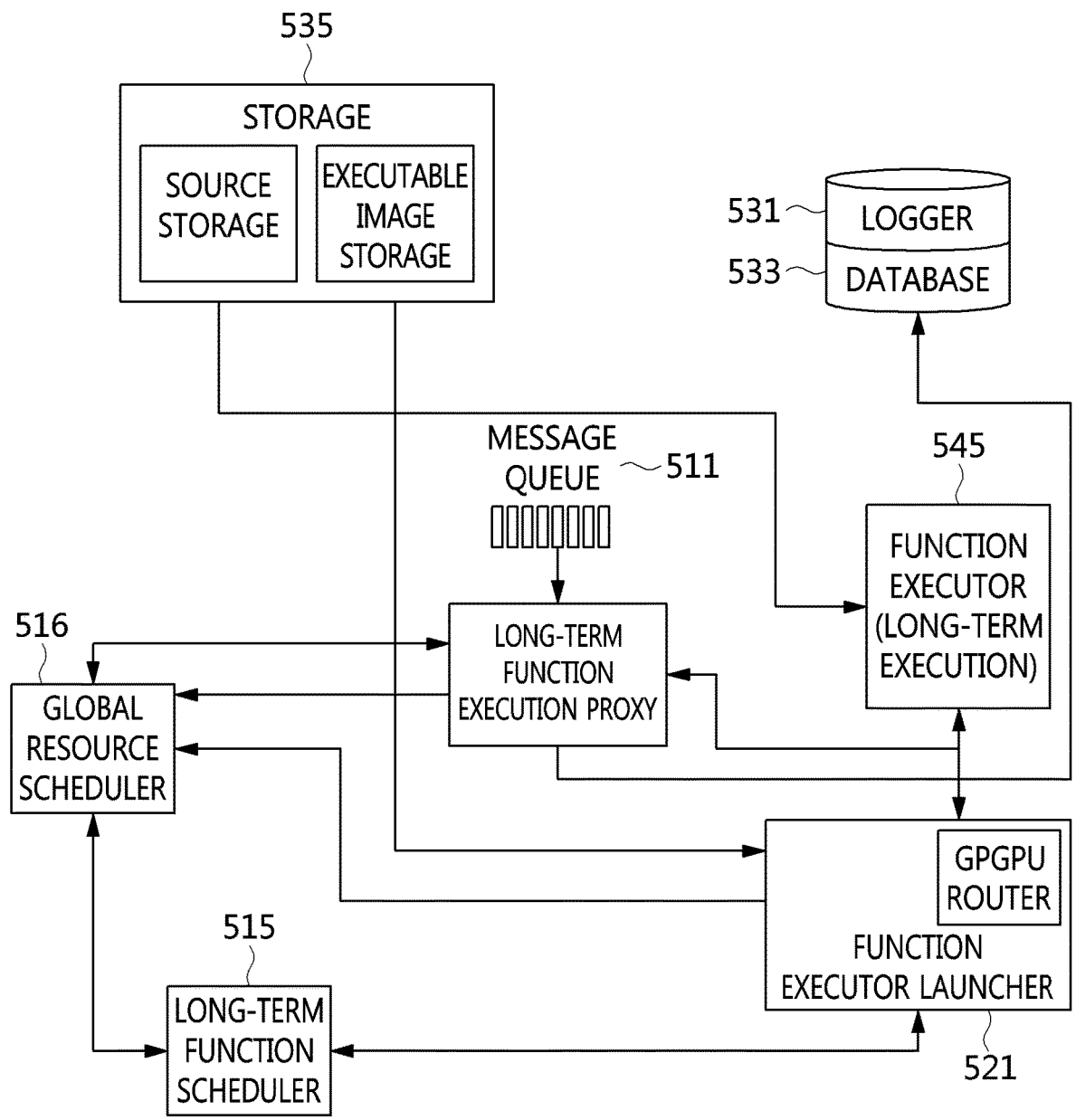
FIG. 9 is a diagram illustrating a process for executing a long-term function according to an embodiment of the present invention.

FIG. 9 is a diagram illustrating a process for executing a long-term function according to an embodiment of the present invention.

As illustrated in FIG. 9, when a message is registered in a message queue 511, the long-term function execution proxy 514 receives a single message from the message queue 511 and starts to execute a long-term function. The long-term function execution proxy 514 requests a function execution node from the global resource scheduler 516 in order to be allocated the function execution node.

The global resource scheduler 516 selects a function execution node enabling long-term execution based on various types of information to be taken into consideration for scheduling, and requests execution from the function executor launcher 521 of the selected function execution node.

The global resource scheduler 516 checks an executable node. As a result of the checking, if it is determined that there is a long-term function executor 545 in a standby state, the global resource scheduler 516 may select a function execution node corresponding to the long-term function executor 545 in the standby state after skipping a procedure for generating a long-term function executor 545 and a procedure for storing changed resource usage information in the global resource scheduler 516, which will be described later.

In contrast, if it is determined that there is no long-term function executor 545 in a standby state, the function executor launcher 521 generates a long-term function executor 545 and the global resource scheduler 516 stores changed resource usage information.

Further, the global resource scheduler 516 transmits information about the function execution node corresponding to the generated long-term function executor 545 or the selected long-term function executor 545 in the standby state to the long-term function execution proxy 514. The function executor launcher 521 may request execution from the function execution node received from the global resource scheduler 516.

The function executor launcher 521 receives an executable image for a lightweight container-based execution environment corresponding to the requested function from the image storage 535 and stores the executable image in the function execution node. Further, the function executor launcher 521 runs the stored executable image based on parameter information received from the global resource scheduler 516.

When the executable image runs, a function node is received from the source storage 535 and is stored in a container, and the long-term function executor 545 is operated and set to an execution standby state. Furthermore, the long-term function executor 545 transmits readiness information for the function executor to the function executor launcher 521. The function executor launcher 521 returns information about the generation of the long-term function executor 545 to the global resource scheduler 516.

The global resource scheduler 516 transmits readiness state information for the long-term function executor 545 to the long-term function execution proxy 514, and the long-term function execution proxy 514 requests execution from the long-term function executor 545 based on the received information.

While the long-term function executor 545 is executing the long-term function, the global resource scheduler 516 may request the long-term function scheduler 515 to adjust system resources. Furthermore, the long-term function scheduler 515 transfers information to the function executor launcher 521 of a management target node, among function execution nodes on which the long-term function is being executed, and may then control the long-term function executor 545 on which the long-term function is being executed.

Also, the function executor launcher 521 may return the results of performing control to the long-term function scheduler 515, and the long-term function scheduler 515 may return information about the results of performing control to the global resource scheduler 516.

Meanwhile, when completing execution of the long-term function, the long-term function executor 545 transmits the execution results of the long-term function to the long-term function execution proxy 514. The long-term function execution proxy 514 may store the execution results of the long-term function in the DB 533, and may return the function execution node used for execution of the long-term function to the global resource scheduler 516.

Further, the process of FIG. 9 indicates the case of initial execution in which there is no function executor in a standby state. When there is a function executor in a standby state, the apparatus 500 for providing long-term function execution in a serverless environment may skip a procedure for generating the long-term function executor 545 and a procedure for storing changed resource usage information in the global resource scheduler 516.

Figure 10:
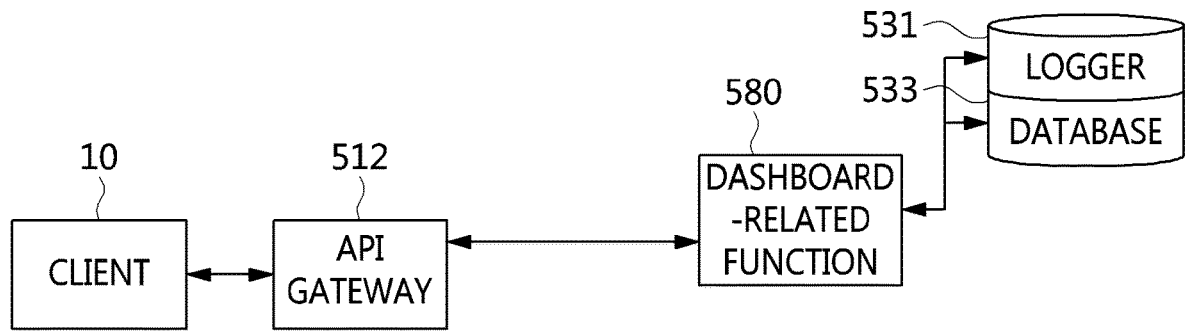
FIG. 10 is a diagram illustrating a process for checking the execution results of a long-term function according to an embodiment of the present invention.

FIG. 10 is a diagram illustrating a process for checking the execution results of a long-term function according to an embodiment of the present invention.

As illustrated in FIG. 10, a client 10 may request the execution results of a long-term function from an API gateway 512, and may check the execution results corresponding to a long-term execution request that has been previously made.

The API gateway 512 checks a command and data corresponding to the execution result request received from the client 10 and searches a function manager 513 for a function corresponding to the execution result request. Further, the API gateway 512 receives metadata about the function, the execution results of which are requested, from the function manager 513, and may request a function execution node from the global resource scheduler 516.

Further, the process of FIG. 10 indicates the case of initial execution, in which there is no function executor in a standby state. When there is a function executor in a standby state, the apparatus 500 for providing long-term function execution in a serverless environment may skip a procedure for generating a short-term function executor 541 and a procedure for storing changed resource usage information in the global resource scheduler 516.

That is, when each function executor 540 in the standby state is managed by the global resource scheduler 516 and there is a function executor 540 in a standby state for the same function, the global resource scheduler 516 may call and reuse the function executor 540 in the standby state without allocating a function execution node.

Here, the global resource scheduler 516 checks an executable node. As a result of the checking, if it is determined that there is a short-term function executor 541 in a standby state, the global resource scheduler 516 may select a function execution node corresponding to the short-term function executor 541 in the standby state after skipping a procedure for generating a short-term function executor 541, and a procedure for storing changed resource usage information in the global resource scheduler 516, which will be described later.

In contrast, if it is determined that there is no short-term function executor 541 in a standby state, the function executor launcher 521 generates a short-term function executor 541, and the global resource scheduler 516 stores changed resource usage information.

Further, the global resource scheduler 516 may transmit information about a function execution node corresponding to the generated short-term function executor 541 or the selected short-term function executor 541 in the standby state to the API gateway 512, and the API gateway 512 may request execution from the short-term function executor 541 of the corresponding function execution node.

The API gateway 512 may call a dashboard function executor 580 through the procedure for executing the short-term function, and this short-term function execution procedure may be substantially identical to that of FIG. 6.

Next, the dashboard function executor 580 generates execution results based on information stored in the logger 531 and the DB 533, and returns the generated execution results to the API gateway 512. Also, the global resource scheduler 516 may store changed resource usage information, and the API gateway 512 may transmit the execution results to the client 10.

Figure 11:
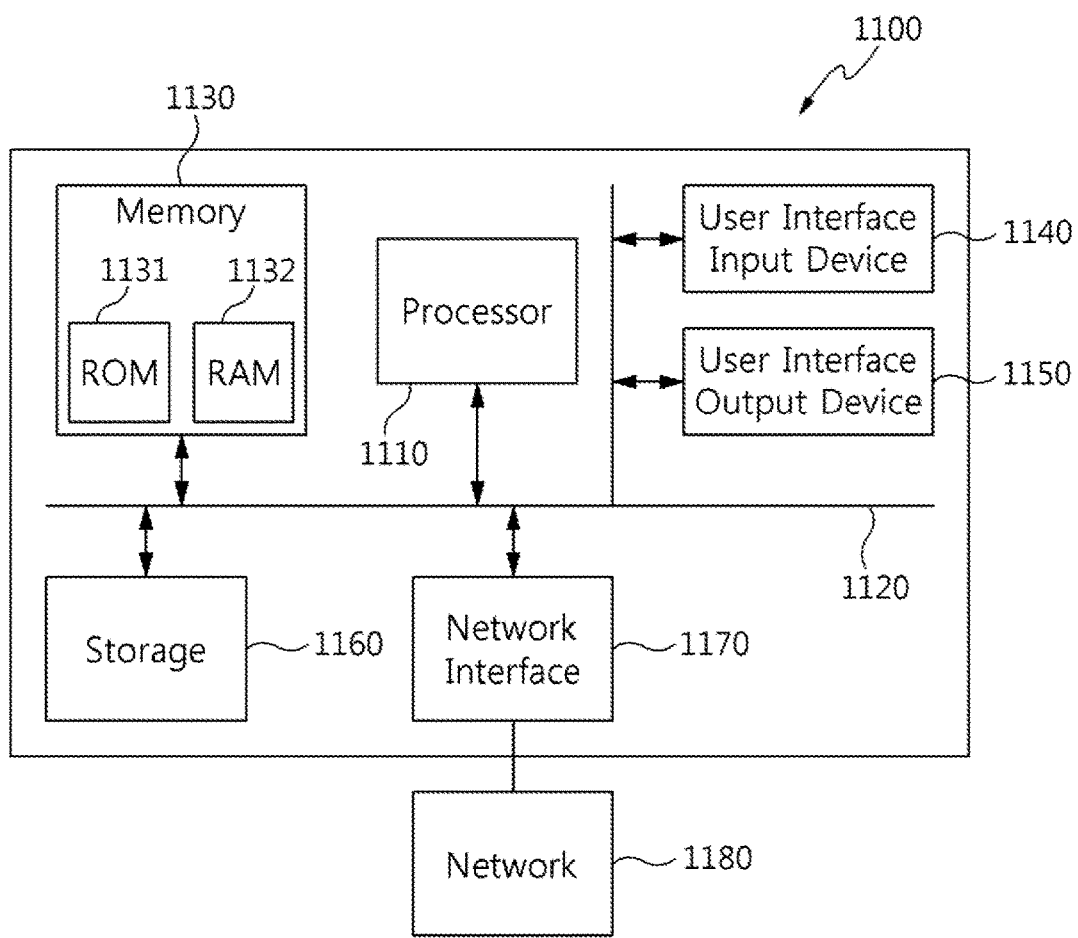
FIG. 11 is a block diagram illustrating a computer system according to an embodiment of the present invention.

FIG. 11 is a block diagram illustrating a computer system according to an embodiment of the present invention.

Referring to FIG. 11, the embodiment of the present invention may be implemented in a computer system 1100 such as a computer-readable storage medium. As illustrated in FIG. 11, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

Therefore, the embodiment of the present invention may be implemented as a non-transitory computer-readable medium in which a computer-implemented method is recorded or in which computer-executable instructions are recorded. When the computer-executable instructions are executed by the processor, the instructions may perform the method according to at least one aspect of the present invention.

In accordance with the present invention, a short-term function and a long-term function may be efficiently executed.

Further, in accordance with the present invention, limitations in scalability may be overcome during execution of functions, and the scalability of physical servers and the scalability of systems may be provided.

Furthermore, in accordance with the present invention, short-term execution and long-term execution of a function in which shared resources are present may be provided, and the shared resources may be efficiently managed.

In addition, in accordance with the present invention, a complicated and extensive system may be efficiently managed and executed using only limited resources.

As described above, in the apparatus and method for providing long-term function execution in a serverless environment according to the present invention, the configurations and schemes in the above-described embodiments are not limitedly applied, and some or all of the above embodiments can be selectively combined and configured such that various modifications are possible.

What is claimed is:

1. A method for providing long-term function execution in a serverless environment, the method being performed by an apparatus for providing the long-term function execution in the serverless environment, the method comprising:
   registering a long-term function execution proxy when a long-term execution request is received from a client;
   allocating a long-term function executor corresponding to the long-term execution request;
   executing, by the long-term function execution proxy, a long-term function using the allocated long-term function executor; and
   storing execution results of the long-term function,
   wherein registering the long-term function execution proxy comprises selecting a function execution node based on execution-related information corresponding to the long-term execution request, and
wherein selecting the function execution node comprises:
determining whether there is a function executor in a standby state;
when it is determined that there is no function executor in the standby state, storing an executable image of a function to be executed in the function execution node, and running the stored executable image; and
storing a function code of the function, and setting a state of the function executor corresponding to the function execution node to the standby state.

2. The method of claim 1, wherein registering the long-term function execution proxy further comprises:
storing, by a short-term function executor corresponding to the selected function execution node, a long-term execution message corresponding to the long-term execution request in a message queue.

3. The method of claim 2, wherein allocating the long-term function executor comprises:
selecting a function execution node that enables long-term execution when the long-term execution message is registered in the message queue; and
allocating a long-term function executor corresponding to the function execution node that enables long-term execution.

4. The method of claim 3, wherein a function executor comprising at least one of the long-term function executor and the short-term function executor is configured to switch a state thereof to the standby state after execution of a function has been completed, and the function executor in the standby state is allocated to execute a function corresponding to the long-term execution request received from the client.

5. The method of claim 1, further comprising:
receiving an execution result request from the client; and
providing the stored execution results to the client.

6. The method of claim 5, wherein providing the execution results to the client comprises:
calling a dashboard-related function when the execution result request is received;
allowing the dashboard-related function to generate execution results based on at least one of a logger and a database; and
providing the generated execution results to the client.

7. The method of claim 6, wherein generating the execution results is configured such that a short-term function executor executes the dashboard-related function and generates the execution results.

8. An apparatus for providing long-term function execution in a serverless environment, comprising:
an Application Programming Interface (API) gateway for receiving a long-term execution request from a client, and registering a long-term function execution proxy when the long-term execution request is received;
a global resource scheduler for receiving execution-related information corresponding to the long-term execution request from the API gateway, and selecting a function execution node based on the execution-related information;
a function executor launcher for generating and managing a function executor corresponding to the selected function execution node; and
a function executor for providing an environment in which a short-term function and a long-term function are executed, executing a function of the function execution node, and storing execution results of the function,
wherein the function executor switches a state thereof to a standby state after execution of the function has been completed, and the function executor in the standby state is allocated to execute a function corresponding to a request received from the client.

9. The apparatus of claim 8, wherein the function executor comprises at least one of a short-term function executor, a long-term function executor, and a dashboard function executor.

10. The apparatus of claim 9, wherein the short-term function executor is configured to, when the long-term function execution proxy is registered, store a long-term execution message corresponding to the long-term execution request received by the API gateway in a message queue.

11. The apparatus of claim 10, wherein the long-term function execution proxy is configured to, when the long-term execution message is stored in the message queue, request the function execution node, and request the long-term function executor corresponding to the function execution node to execute the function.

12. The apparatus of claim 11, wherein the long-term function execution proxy stores execution results of the function executed by the long-term function executor in at least one of a logger and a database and returns resources to the global resource scheduler.

13. The apparatus of claim 12, further comprising:
storage for storing an executable code of the function and a lightweight container executable image related to an execution environment of the function;
the logger for storing execution logs of the function; and
the database for storing the execution results of the function.

14. The apparatus of claim 9, wherein the dashboard function executor is configured to, when an execution result request is received from the client, generate execution results corresponding to the long-term execution request based on information stored in at least one of a logger and a database.

15. The apparatus of claim 8, wherein the global resource scheduler determines whether there is a function executor in a standby state, and selects a function execution node corresponding to the function executor in the standby state when it is determined that there is the function executor in the standby state.

16. The apparatus of claim 15, wherein the function executor launcher is configured to, when it is determined that there is no function executor in the standby state, generate the function executor and store changed resource usage information in the global resource scheduler.

17. The apparatus of claim 16, wherein:
the function executor launcher is configured to operate the function executor by running an executable image of the function, and
the function executor stores a function code of the function and sets a state of the function executor to the standby state.

18. A method for providing long-term function execution in a serverless environment, the method being performed by an apparatus for providing the long-term function execution in the serverless environment, the method comprising:
receiving a long-term execution request from a client and storing a long-term execution message corresponding to the long-term execution request in a message queue using a short-term function executor;

when the long-term execution message is registered in the message queue, allocating an execution node that enables long-term execution to operate a long-term function executor, and storing results of long-term execution corresponding to the long-term execution request; and when an execution result request is received from the client, calling a dashboard-related function, allowing the dashboard-related function to generate execution results based on information stored in at least one of a logger and a database, and providing the generated execution results to the client.

* * * * *